United States Patent Office 2,838,550
Patented June 10, 1958

2,838,550

11α-HYDROXY-4,16-PREGNADIENE-3,20-DIONE AND ESTERS

Douglas A. Lyttle and Robert H. Levin, Kalamazoo Township, Kalamazoo County, Mich., assignors to The Upjohn Company, Kalamazoo, Mich., a corporation of Michigan No Drawing. Application August 27, 1953
Serial No. 376,989

16 Claims. (Cl. 260—397.45)

The present invention relates to novel steroid compounds and is more particularly concerned with 11α-oxygenated-4,16-pregnadiene-3,20-diones, especially with the novel 11α-hydroxy-4,16-pregnadiene-3-20-dione and the 11α-esters thereof, and with a process for the production thereof.

The novel compounds of the present invention are illustratively represented by the following formula:

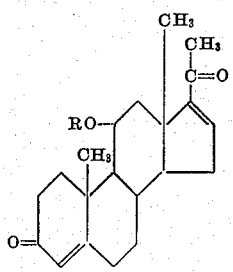

wherein R is hydrogen or the acyl radical of a carboxylic acid containing up to and including eight carbon atoms.

The novel compounds of this invention as well as the corresponding esters of other acids are prepared by forming a 3-hydrazone of an 11α-acyloxy-17α-halo-4-pregnene-3,20-dione by treating 11α-acyloxy-4,17α-dihalopregnane-3,20-dione in the presence of an acid with an organic hydrazine capable of forming a hydrazone, hydrolyzing the 3-hydrazone, and dehydrohalogenating the resulting 11α-acyloxy-17α-halo-4-pregnene-3,20-dione to form the desired 11α-acyloxy-4,16-pregnadiene-3,20-dione which, when desired, can be hydrolyzed with acid or base to yield 11α-hydroxy-4,16-pregnadiene-3,20-dione. In this process any organic hydrazine containing two hydrogen atoms on one of the hydrazino nitrogen atoms can be used. The hydrolysis of the 3-hydrazone group is advantageously effected by an exchange reaction with a ketaldone. The word "ketaldone" refers generically to aldehydes and ketones. For this purpose a ketaldone in which the oxo group is attached to an electrophylic group, as in pyruvic acid, pyruvic aldehyde, and benzaldehydes, such as meta-, para-, and ortho-hydroxybenzaldehydes, and meta-, para-, and ortho-carboxy-benzaldehydes, is advantageous. The dehydrohalogenation advantageously is effected with an amine such as pyridine. The hydrolysis is advantageously effected by means of a strong base such as sodium or potassium hydroxide.

It is an object of the present invention to provide the novel 11α-hydroxy-4,16-pregnadiene-3,20-dione and 11α-acyloxy-4,16-pregnadiene-3,20-diones. Another object of the invention is to provide a process for the production of 11α-hydroxy-4,16-pregnadiene-3,20-dione and 11α-acyloxy-4,16-pregnadiene-3,20-diones. Other objects of this invention will be apparent to one skilled in the art to which this invention pertains.

The novel compounds, 11α-hydroxy-4,16-pregnadiene-3,20-dione and 11α-acyloxy-4,16-pregnadiene-3,20-dione, are stable, easily crystallizable solids which have not only valuable pharmacological and physiological activity, but are also important intermediates in the production of active 11-oxygenated keto steroids. For example, epoxidation of 11α-hydroxy-4,16-pregnadiene-3,20-diones or an ester thereof yields 11α-hydroxy or 11α-acyloxy-16,17-oxidoprogesterone. The epoxide is then opened with hydrogen bromide and the resulting 16-bromo-17a-hydroxy derivative is treated with zinc dust to remove the bromine and yield 11α-hydroxy- or 11α-acyloxy-17α-hydroxyprogesterone. Oxidation of 11α,17α-dihydroxyprogesterone or saponification and oxidation of 11α-acyloxy-17α-hydroxyprogesterone yields known 17α-hydroxy-11-ketoprogesterone (21-desoxy "E"), which on treatment with lead tetraacetate, followed by saponification gives cortisone (17α,21-dihydroxy-4-pregnene-3,11,20-trione) and on treatment with lithium aluminum hydride, with protection of the 3- and 20-keto groups, gives 11β,17α-dihydroxy-4-pregnene-3,20-dione (21-desoxy "F"), a new compound possessing pronounced inhibiting effect on the secretion of the adrenocorticotropic hormone (ACTH) and having value, therefore, in the treatment of diseases where oversecretion of ACTH and adrenal hormones occurs, for example, in adrenal hyperplasia and pituitary basophilism (Cushing's disease).

The starting compounds of the present invention are the 4,17α-dihalo-11α-acyloxypregnane-3,20-diones. Advantageously, the acyl group is the carboxacyl group of a carboxylic acid containing not more than eight carbon atoms. The acyl group can be carboxacyl, sulfonacyl, phosphonacyl and the like and can have substituents, such as halo, mercapto, methoxy, ethoxy, hydroxy, carboxy, carbalkoxy, and the like. The halo group advantageously is bromine or chlorine. The starting compounds are prepared by treatment of 11α-hydroxypregnane-3,20-dione or 11α-acyloxypregnane-3,20-diones with an acid anhydride to form the corresponding enol esters, 3,11α,20-triacyloxy-4,17(20)-pregnadienes, which by treatment with a hypohalous acid furnish the 4,17α-dihalo-11α-acyloxypregnane-3,20-dione as shown in Preparations 1 to 5, inclusive.

In carrying out the process of the present invention, the selected 4,17α-dihalo-11α-acyloxypregnane-3,20-dione is dissolved in an organic solvent, such as dioxane, acetic acid, acetone, dimethylformamide, tertiary butyl alcohol, and ethanol, or mixtures of these solvents, with dioxane and acetic acid preferred, containing from five to 25 percent water, and to this solution is added, usually with continuous stirring, a solution of organic hydrazine, such as semicarbazide, phenylhydrazine, 2,4-dinitrophenylhydrazine, para-nitrophenylhydrazine, α- or β-naphthylsemicarbazide, 2,4- and 3,5-dinitrophenylsemicarbazide, and other substituted hydrazines, with semicarbazide preferred.

The 11α-acyloxy-17α-halo-4-pregnene-3,20-dione 3-substituted hydrazone thus-obtained may be isolated from the mixture by adding more water and filtering the precipitated compound, or, in the preferred embodiment of the invention, may be immediately reacted in the solution with a suitable aldehyde or ketone without isolation. The aldehydes or ketones used are usually pyruvic acid, pyruvic aldehyde, such as, hydroxy- and carboxybenzaldehydes, and the like. Pyruvic acid is preferred as it is water soluble and can be used in aqueous organic solvents such as dioxane-water solution, while benzaldehydes are usually used in acetic acid solutions. The temperature of the reaction can vary between about zero and about 100 degrees centigrade but advantageously is kept between about 25 and about seventy degrees. The reaction time depends in part on the temperature and varies at room temperature, i. e., at about twenty to about thirty degrees centigrade between eight and 36 hours, and at temperatures, between fifty and seventy degrees centigrade, from one to about four hours. The product, 11α-acyloxy-17α-halo-4-pregnene-3,20-dione, is isolated from the solution by pouring the cooled solution into water and extracting with a suitable solvent, such as dichloromethane, chloroform, ether or benzene, and evaporating the solvent from the resulting extract.

The 11α-acyloxy-17α-halo-4-pregnene-3,20-dione is then admixed with a large excess of an amine which acts both as a reactant and as a solvent, and the resulting solution is heated for a suitable length of time. Any suitable amine, such as, for example, pyridine, quinoline, picoline, lutidine, collidine, methylbenzylamine, aniline and the like can be used. Pyridine is the preferred amine. The reaction is generally conducted at the boiling point of the solution, but any temperature of about eighty to about 180 degrees centigrade is operative. The period of heating is usually dependent on the amine used, with the higher boiling amines requiring a shorter period of heating than the lower-boiling amines. Any period of about four to about 24 hours is operative, with about eight hours being preferred. If the amine used has a very high boiling point, a solvent such as benzene, toluene, xylene, or the like, can be advantageously employed for temperature control. The thus-produced 11α-acyloxy-4,16-pregnadiene-3,20-dione is recovered from the reaction mixture by conventional means, such as extraction and recrystallization.

In order to obtain 11α-hydroxy-4,16-pregnadiene-3,20-dione, 11α-acyloxy-4,16-pregnadiene-3,20-dione, dissolved in an aqueous organic solvent, such as aqueous methanol, aqueous ethanol, aqueous dioxane, aqueous tertiary butyl alcohol, etc., is saponified with a base, such as sodium hydroxide, potassium hydroxide, barium hydroxide, or other like base, with sodium and potassium hydroxide preferred. The mixture is usually heated under reflux for a period of about two to about twelve hours, or even longer. The excess alkali then is neutralized suitably with a dilute mineral acid, such as hydrochloric or sulfuric acid, the organic solvent removed under reduced pressure, and the water by azeotropic distillation with benzene. The remaining oil can be purified by conventional means such as, chromatography and recrystallization from suitable solvents such as acetone, Skellysolve B (hexanes) methanol, ethanol, ethyl acetate, and mixtures thereof.

The following examples illustrate the process and product of the present invention but are not to be construed as limiting.

PREPARATION 1

*3,11α,20-triacetoxy-3,17(20)-pregnadiene*

A mixture of 300 milligrams of 11α-hydroxypregnane-3,20-dione, fifteen milliliters of acetic anhydride and 140 milligrams of para-toluenesulfonic acid monohydrate was heated to boiling and allowed to distil slowly for four hours, most of the excess acetic anhydride being distilled at the end of this time interval. The last traces of excess acetic anhydride were removed under vacuum, and the resulting residue was cooled and dissolved in ether. The ether solution was washed with cold ten percent aqueous sodium bicarbonate solution and dried over anhydrous sodium sulfate. The drying agent was removed by filtration, and the ether was distilled. The residue was dissolved in warm alcohol and allowed to crystallize. The crystalline 3,11α,20-triacetoxy-3,17(20)-pregnadiene (150 milligrams) melted at 162–167 degrees centigrade. Its structure was confirmed by infrared analysis.

PREPARATION 2

*3,11α,20-tripropionoxy-3,17(20)-pregnadiene*

Using the procedure of Preparation 1, 11α-hydroxypregnane-3,20-dione is converted to 3,11α,20-tripropionoxy-3,17(20)-pregnadiene using propionic anhydride and para-toluenesulfonic acid.

PREPARATION 3

*3,11α,20-triheptanoyloxy-3,17(20)-pregnadiene*

11α-hydroxypregnene-3,20-dione is converted by the procedure of Preparation 1 to 3,11α,20-triheptanoyloxy-3,17(20)-pregnadiene by heating for five hours with heptanoic anhydride and para-toluenesulfonic acid with toluene added as a solvent.

By the procedure of Preparations 1 through 3, other 3,11α,20-triacyloxy-3,17(20)-pregnadienes prepared by heating 11α-hydroxy-pregnane-3,20-dione with a selected acid anhydride include: 3,11α,20-tributyroxy-3,17(20)-pregnadiene, 3,11α,20-trivaleroxy-3,17(20)-pregnadiene, 3,11α,20-triisovaleroxy-3,17(20)-pregnadiene, 3,11α,20-trihexanoyloxy-3,17(20)-pregnadiene, 3,11α,20-trioctanoyloxy-3,17(20)-pregnadiene, 3,11α,20-tribenzoyloxy-3,17(20)-pregnadiene, and the like.

PREPARATION 4

*3,20-diacetoxy-11α-benzoyloxy-3,17(20)-pregnadiene*

To 11α-hydroxypregnane-3,20-dione was added an excess of benzoyl chloride. After the solution stood for one hour at room temperature, water was added and the crystals filtered off and washed. The thus-obtained 11α-benzoyloxypregnane-3,20-dione was then treated as in Preparation 1 with acetic anhydride to give 3,20-diacetoxy-11α-benzoyloxy-3,17(20)-pregnadiene.

In the same manner as shown above by treating a selected 11α-acyloxypregnane-3,20-dione with an acid anhydride, 3,20-enol esters of 11α-acyloxypregnane-3,20-dione wherein the acyloxy group on the 3- and 20-position are equal and the 11α-position has another acyloxy group are obtained. Representative 3,11,20-triacyloxy-3,17-(20)-pregnadienes include: 3,20-dipropionoxy-11α-benzoyloxy-3,17(20)-pregnadiene, 3,20-dibutyroxy-11α-benzoyloxy-3,17(20)-pregnadiene, 3,20-divaleroxy-11α-benzoyloxy-3,17(20)-pregnadiene, 3,20-dihexanoyloxy-11α-benzoyloxy-3,17(20)-pregnadiene, 3,20-diacetoxy-11α-propionoxy-3,17(20)-pregnadiene, 3,20-diacetoxy-11α-butyroxy-3,17(20)-pregnadiene, 3,20-diacetoxy-11α-valeroxy-3,17(20)-pregnadiene, 3,20-diacetoxy-11α-isovaleroxy-3,17(20)-pregnadiene, 3,20-diacetoxy-11α-hexanoyloxy-3,17(20)-pregnadiene, 3,20-diacetoxy-11α-heptanoyloxy-3,17(20)-pregnadiene, 3,20-diacetoxy-11α-octanoyloxy-3,17(20)-pregnadiene, 3,20-diacetoxy-11α-phenylacetoxy-3,17(20)-pregnadiene, 3,20-diacetoxy-11α-toluyloxy-3,17(20)-pregnadiene, 3,20-diacetoxy-11α-(β-cyclopentyl)-propionoxy-3,17(20)-pregnadiene, 3,20-diacetoxy-11α-trimethylacetoxy-3,17(20)-pregnadiene, 3,20-diacetoxy-11α-chloroacetoxy-3,17(20)-pregnadiene, 3,20-diacetoxy-11α-bromoacetoxy-3,17(20)-pregnadiene, 3,20-diacetoxy-11α-dichloroacetoxy-3,17(20)-pregnadiene, 3,20-diacetoxy-11α-trichloroacetoxy-3,17(20)-pregnadiene, 3,20-diacetoxy-11α-anisyloxy-3,17(20)-pregnadiene, 3,20-diacetoxy-11α-gallyloxy-3,17(20)-pregnadiene, 3,20-diacetoxy-11α-mandelyloxy-3,17(20)-pregnadiene, 3,20-diacetoxy-11α-thioglycolyloxy-3,17(20)-pregnadiene, 3,20-diacetoxy-11α-toluenesulfonyloxy-3,17(20)-pregnadiene, 3,20-diacetoxy-11α-benzenesulfonyloxy-3,17(20)-pregnadiene, 3,20-diacetoxy-11α-chlorobenzenesulfonyloxy-3,17(20)-pregnadiene, 3,20-diacetoxy-11α-(α-naphthylsulfonyloxy)-3,17(20)-pregnadiene, 3,20-diacetoxy-11α-benzenephosphonyloxy-3,17(20)-pregnadiene, and the like.

PREPARATION 5

*4,17α-dibromo-11α-acetoxypregnane-3,20-dione*

One hundred and fifty milligrams (150 milligrams) of 3,11α,20-triacetoxy-3,17(20)-pregnadiene was dissolved in eight milliliters of tertiary butyl alcohol and treated with a solution of 128 milligrams of N-bromosuccinimide in fifteen milliliters of tertiary butyl alcohol and with five milliliters of 0.8 Normal acid. After two hours of standing the solution was concentrated, diluted with water and the resulting crystals (140 milligrams) collected. Four recrystallizations from alcohol gave white crystals of 11α-acetoxy-4,17α-dibromopregnane-3,20-dione melting at 201 to 203 degrees centigrade with decomposition.

*Analysis.*—Calc. for $C_{23}H_{32}O_4Br$: C, 51.89; H, 6.06; Br, 30.03. Found: C, 52.16; H, 5.96; Br, 30.01.

In the same manner, using 3,20-di-enol acylate of a selected 11α-acyloxy pregnadiene compound and N-bromosuccinimide, the following compounds are prepared: 4,17α-dibromo-11α-propionyloxypregnane-3,20-dione, 4,17α-dibromo - 11α - butyroxypregnane-3,20-dione, 4,17α-dibromo-11α-valeroxypregnane-3,20-dione, 4,17α-dibromo-11α-isovaleroxypregnane-3,20-dione, 4,17α-dibromo-11α-hexanoyloxypregnane-3,20-dione, 4,17α-dibromo-11α-heptanoyloxypregnane-3,20-dione, 4,17α-dibromo-11α-octanoyloxypregnane - 3,20 - dione, 4,17α-dibromo-11α-benzoyloxypregnane-3,20-dione, 4,17α-dibromo-11α-phenylacetoxypregnane-3,20-dione, 4,17α-dibromo-11α-toluyloxypregnane-3,20-dione, 4,17α-dibromo-11α-(β - cyclopentyl) - propionoxypregnane - 3,20 - dione, 4,17α-dibromo-11α - trimethylacetoxypregnane-3,20-dione, 4,17α-dibromo-11α-chloroacetoxypregnane - 3,20 - dione, 4,17α-dibromo-11α - dichloroacetoxypregnane-3,20-dione, 4,17α-dibromo-11α - trichloroacetoxypregnane-3,20-dione, 4,17α-dibromo - 11α - bromoacetoxypregnane-3,20-dione, 4,17α-dibromo-11α-anisyloxypregnane-3,20-dione, 4,17α-dibromo-11α-gallyloxypregnane-3,20-dione, 4,17α-dibromo-11α-mandelyloxypregnane-3,20-dione, 4,17α-dibromo-11α-thioglycolyloxypregnane-3,20-dione, 4,17α-dibromo-11α-toluenesulfonyloxypregnane-3,20-dione, 4,17α-dibromo-11α-benzenesulfonyloxypregnane-3,20-dione, 4,17α-dibromo - 11α - chlorobenzenesulfonyloxypregnane-3,20-dione, 4,17α-dibromo-11α-(α-naphthylsulfonyloxy)-pregnane-3,20-dione, 4,17α-dibromo-11α-benzenephosphonyloxypregnane-3,20-dione, and the like.

PREPARATION 6

4,17α-dichloro-11α-acetoxypregnane-3,20-dione

Following the procedure given in Preparation 5, but using hypochlorous acid, or a mineral acid with a hypochlorite such as sodium or calcium hypochlorite, or N-chlorosuccinimide or N-chloroacetamide with dilute sulfuric acid instead of the N-bromosuccinimide, to treat a solution of 3,11α,20-triacetoxy-3,17(20)-pregnadiene in tertiary butyl alcohol, 4,17α-dichloro-11α-acetoxypregnane-3,20-dione is obtained.

In the same manner, using 3,20-di-enol acylates of the selected 11α-acyloxypregnane compound and hypochlorous acid or an N-chloroacylamide, the following compounds are prepared: 4,17α-dichloro-11α-propionoxypregnane-3,20-dione, 4,17α-dichloro-11α-butyroxypregnane-3,20-dione, 4,17α-dichloro-11α-valeroxypregnane-3,20-dione, 4,17α-dichloro-11α-isovaleroxypregnane-3,20-dione, 4,17α-dichloro-11α-hexanoyloxypregnane-3,20-dione, 4,17α-dichloro-11α-heptanoyloxypregnane-3,20-dione, 4,17α-dichloro-11α-octanoyloxypregnane-3,20-dione, 4,17α-dichloro-11α-benzoylpregnane-3,20-dione, 4,17α-dichloro-11α-phenylacetoxypregnane-3,20-dione, 4,17α-dichloro-11α-toluyloxypregnane-3,20-dione, 4,17α-dichloro-11α-(β-cyclopentyl)-propionoxypregnane - 3,20 - dione, 4,17α-dichloro-11α-trimethylacetoxypregnane-3,20 - dione, 4,17α-dichloro-11α-chloroacetoxypregnane - 3,20 - dione, 4,17α-dichloro-11α-dichloroacetoxypregnane - 3,20-dione, 4,17α-dichloro-11α-bromoacetoxypregnane - 3,20 - dione, 4,17α-dichloro-11α-anisyloxypregnane-3,20-dione, 4,17α-dichloro-11α-gallyloxypregnane-3,20-dione, 4,17α-dichloro-11α-mandelyloxypregnane-3,20-dione, 4,17α-dichloro-11α-thioglycolyloxypregnane-3,20-dione, 4,17α-dichloro-11α-toluenesulfonyloxypregnane-3,20-dione, 4,17α-dichloro-11α-benzenesulfonyloxypregnane-3,20-dione, 4,17α-dichloro - 11α - chlorobenzenesulfonyloxypregnane-3,20-dione, 4,17α-dichloro-11α-(α-naphthylsulfonyloxy)-pregnane-3,20-dione, 4,17α-dichloro-11α-benzenephosphonyloxypregnane-3,20-dione, and the like.

EXAMPLE 1

11α-acetoxy-17α-bromo-4-pregnene-3,20-dione

A solution of 532 milligrams (one millimole) of 4,17α-dibromo-11α-acetoxypregnane-3,20-dione in 100 milliliters of dioxane was admixed with 2.5 milliliters of an aqueous solution containing 223 milligrams (two millimoles) of semicarbazide and 164 milligrams (two millimoles) of sodium acetate (anhydrous). The color of the reaction mixture changed slowly from very light yellow to orange and gradually back to a pale yellow color. The mixture was stirred overnight at room temperature and thereafter a solution consisting of 0.52 milliliter of pyruvic acid in five milliliters of water was added. The reaction mixture was then heated to about seventy degrees centigrade for a period of three hours, thereafter cooled and poured into 200 milliliters of water. The thus-produced 11α-acetoxy-17α-bromo-4-pregnene-3,20-dione was extracted from the aqueous mixture with three 75-milliliter portions of methylene dichloride. The extracts were washed with two fifty-milliliter portions of one percent aqueous sodium hydroxide solution, then with water until the wash-water was neutral, and then dried over anhydrous sodium sulfate and concentrated to yield 0.452 gram of an oil. This oil, containing 11α-acetoxy-17α-bromo-4-pregnene-3,20-dione was purified by chromatography and recrystallization from acetone and Skellysolve B (hexanes) yielding 162 milligrams of 11α-acetoxy-17α-bromo - 4 - pregnane-3,20-dione of melting point 166 to 168 degrees centigrade.

*Analysis.*—Calculated for $C_{23}H_{31}BrO_4$: Br, 17.70. Found: Br, 17.65.

EXAMPLE 2

11α-propionoxy-17α-chloro-4-pregnene-3,20-dione

In a manner as given in Example 1, 4,17α-dichloro-11α-propionoxypregnane-3,20-dione is dehydrohalogenated with semicarbazide and pyruvic acid to yield 11α-propionoxy-17α-chloro-4-pregnane-3,20-dione.

EXAMPLE 3

11α-(β-cyclopentylpropionoxy)-17α-bromo-4-pregnene-3,20-dione

In a manner as given in Example 1, 4,17α-dibromo-11α-(β-cyclopentylpropionoxy)-pregnane-3,20-dione is dehydrohalogenated with semicarbazide and pyruvic acid to yield 11α-(β-cyclopentylpropionoxy)-17α-bromo-4-pregnene-3,20-dione.

EXAMPLE 4

11α-butyroxy-17α-chloro-4-pregnene-3,20-dione

In a manner as given in Example 1, 4,17α-dichloro-11α-butyroxypregnane-3,20-dione is dehydrohalogenated with semicarbazide and pyruvic acid to yield 11α-butyroxy-17α-chloro-4-pregnene-3,20-dione.

EXAMPLE 5

11α-benzoyloxy-17α-bromo-4-pregnene-3,20-dione

In a manner as given in Example 1, 4,17α-dibromo-11α-benzoyloxypregnane-3,20-dione is dehydrohalogenated with semicarbazide and pyruvic acid to yield 11α-benzoyloxy-17α-bromo-4-pregnene-3,20-dione.

Following the procedure of Examples 1 through 5 using any of the various preparations under Preparations 5 and 6, there are obtained the following 11α-acyloxy-17α-halo - 4 - pregnene - 3,20 - diones: 11α-valeroxy-17α-chloro- or bromo-4-pregnene-3,20-dione, 11α-isovaleroxy-17α-chloro- or bromo - 4 - pregnene - 3,20 - dione, 11α-hexanoyloxy - 17α - chloro- or bromo-4-pregnene-3,20-dione, 11α - heptanoyloxy - 17α - chloro- or bromo-4-pregnene-3,20-dione, 11α-octanoyloxy - 17α - chloro- or bromo - 4 - pregnene - 3,20 - dione, 11α-phenylacetoxy-17α-chloro- or bromo - 4 - pregnene - 3,20 - dione, 11α-toluyloxy-17α-chloro- or bromo-4-pregnene-3,20-dione, 11α-trimethylacetoxy-17α-chloro- or bromo-4-pregnene- 3,20-dione, 11α-chloroacetoxy - 17α - chloro- or bromo-4-pregnene-3,20-dione, 11α - dichloroacetoxy-17α-chloro- or bromo - 4 - pregnene - 3,20 - dione, 11α-trichloroacetoxy - 17α - chloro- or bromo-4-pregnene-3,20-dione, 11α-bromoacetoxy - 17α - chloro- or bromo-4-pregnene-3,20-dione, 11α - anisyloxy - 17α - chloro- or bromo-4-pregnene-3,20-dione, 11α - gallyloxy - 17α - chloro- or bromo - 4 - pregnene - 3,20 - dione, 11α - mandelyloxy-17α-chloro- or bromo-4-pregnene - 3,20 - dione, 11α-thioglycolyloxy - 17α - chloro- or bromo - 4 - pregnene-3,20-dione, 11α-toluenesulfonyloxy-17α-chloro- or bromo-4-pregnene - 3,20 - dione, 11α - benzenesulfonyloxy-17α-chloro- or bromo - 4 - pregnene-3,20-dione, 11α-chlorobenzenesulfonyloxy - 17α - chloro- or bromo-4-pregnene-3,20-dione, 11α-(α-naphthylsulfonyloxy)-17α-chloro- or bromo - 4 - pregnene - 3,20 - dione, 11α-benzenephosphonyloxy-17α-chloro- or bromo-4-pregnene-3,20-dione, and the like.

EXAMPLE 6

*11α-acetoxy-4,16-pregnadiene-3,20-dione*

One gram of 11α-acetoxy-17α-bromo-4-pregnene-3,20-dione was dissolved in 25 milliliters of dry pyridine and heated under reflux during a period of 24 hours. Thereafter most of the pyridine was removed by distillation under reduced pressure. The residue was then dissolved in fifty milliliters of benzene. Fifty milliliters of water were added to the benzene solution and the mixture was washed with one Normal hydrochloric acid until all pyridine was removed. Thereafter the benzene solution was washed with water until neutral, dried over anhydrous magnesium sulfate and concentrated to dryness under reduced pressure. The residual oil crystallized spontaneously. The thus-obtained crystals of 11α-acetoxy-4,16-pregnadiene-3,20-dione were recrystallized from a solution consisting of two milliliters of ethyl acetate and twenty milliliters of Skellysolve B (hexanes) yielding 708 milligrams (86.3 percent) of 11α-acetoxy-4,16-pregnadiene-3,20-dione in the form of needles. A second recrystallization from 2.5 milliliters of isopropyl alcohol yielded 622 milligrams (75.7 percent) of 11α-acetoxy-4,16-pregnadiene-3,20-dione of melting point 176 to 178 degrees centigrade.

EXAMPLE 7

*11α-hydroxy-4,16-pregnadiene-3,20-dione*

A mixture of 740 milligrams (two millimoles) of 11α-acetoxy-4,16-pregnadiene-3,20-dione, 168 milligrams of potassium hydroxide, seven milliliters of water and twenty milliliters of purified dioxane was heated under reflux for a period of seven hours. The excess alkali was then neutralized with one tenth Normal hydrochloric acid, and some silica which separated, was removed by filtration. The volatile solvents were removed by distillation under reduced presure and the last traces of water by azeotropic distillation with benzene. The remainder, an oil which could not be induced to crystallize, was chromatographed over 65 grams of Florisil (anhydrous magnesium silicate). Practically all the material was recovered with a solution containing one part of acetone and nine parts of Skellysolve B (hexanes). The like fractions were combined, concentrated and the residue recrystallized from a solution consisting of fifteen milliliters of ethyl acetate and twenty milliliters of Skellysolve B (hexanes) yielding 447 milligrams (68 percent) of 11α-hydroxy-4,16-pregnadiene-3,20-dione of melting point 179 to 180 degrees centigrade.

*Analysis.*—Calculated for $C_{21}H_{28}O_3$: C, 76.79; H, 8.59. Found: 76.92; H, 8.39.

EXAMPLE 8

*11α-benzoyloxy-17α-bromo-4-pregnene-3,20-dione*

A solution of 4,17α-dibromo-11α-benzoyloxypregnane-3,20-dione dissolved in acetic acid, was admixed with a solution of 2,4-dinitrophenylhydrazine hydrochloride and sodium acetate in acetic acid. After stirring for eighteen hours at room temperature the mixture was poured into water and the 3-(2,4-dinitrophenyl)-hydrazone of 11α-benzoyloxy - 17α - bromo-4-pregnene-3,20-dione was obtained by extraction with methylene dichloride. The thus-obtained 2,4-dinitrophenylhydrazone was then heated with para-hydroxybenzaldehyde in acetic acid solution to give 11α-benzoyloxy-17α-bromo-4-pregnene-3,20-dione.

In the same manner as in the above example but using 3,5-dinitrophenylhydrazone, phenylhydrazine, para-nitrophenylhydrazine, semicarbazide, or α- or β-naphthylsemicarbazide instead of 2,4-dinitrophenylhydrazine and pyruvic acid, pyruvic aldehyde or carboxybenzaldehydes instead of para - hydroxybenzaldehyde to treat 11α-benzoyloxy - 4,17α - dibromopregnane-3,20-dione, 11α-benzoyloxy-17α-bromo-4-pregnene-3,20-dione is obtained.

EXAMPLE 9

*11α-benzoyloxy-4,16-pregnadiene-3,20-dione*

A solution of 11α-benzoyloxy-17α-bromo-4-pregnene-3,20-dione, dissolved in collidine, was kept during a period of 24 hours at a temperature between about 110 and 120 degrees centigrade. Thereafter the reaction mixture was diluted with ether and washed repeatedly with one Normal hydrochloric acid to remove the collidine. The excess acid was removed from the ether solution by washing with a sodium carbonate solution and finally water. The ether solution was then dried over anhydrous sodium sulfate and evaporated. The thus-obtained residue was chromatographed as described in Example 2 to yield 11α-benzoyloxy-4,16-pregnadiene-3,20-dione.

EXAMPLE 10

*11α-hydroxy-4,16-pregnadiene-3,20-dione*

In a manner as given in Example 7, 11α-benzolyoxy-4,16-pregnadiene-3,20-dione is hydralyzed with potassium hydroxide in aqueous dioxane to give 11α-hydroxy-4,16-pregnadiene-3,20-dione.

EXAMPLE 11

*11α-propionoxy-4,16-pregnadiene-3,20-dione*

In a manner as given in Example 6, 11α-propionoxy-17α-chloro-4-pregnene-3,20-dione is dehydrohalogenated with pyridine to yield 11α-propionoxy-4,16-pregnadiene-3,20-dione.

EXAMPLE 12

*11α-hydroxy-4,16-pregnadiene-3,20-dione*

In a manner as given in Example 7, 11α-propionoxy-4,16-pregnadiene-3,20-dione is hydrolyzed with sodium hydroxide in tertiary butyl alcohol to give 11α-hydroxy-4,16-pregnadiene-3,20-dione.

EXAMPLE 13

*11α-(β-cyclopentylpropionoxy)-4,16-pregnadiene-3,20-dione*

In a manner as given in Example 6, 11α-(β-cyclopentylpropionoxy)-17α-chloro-4-pregnene-3,20-dione is dehydrohalogenated with pyridine to yield 11α-(β-cyclopentylpropionoxy)-4,16-pregnadiene-3,20-dione.

EXAMPLE 14

*11α-hydroxy-4,16-pregnadiene-3,20-dione*

In a manner as given in Example 7, 11α-(β-cyclopentylpropionoxy) - 4,16 - pregnadiene-3,20-dione is hydrolyzed with potassium hydroxide in aqueous dioxane to give 11α-hydroxy-4,16-pregnadiene-3,20-dione.

EXAMPLE 15

*11α-butyroxy-4,16-pregnadiene-3,20-dione*

In a manner as given in Example 6, 11α-butyroxy-17α-chloro-4-pregnene-3,20-dione is dehydrohalogenated with pyridine to yield 11α-butyroxy-4,16-pregnadiene-3,20-dione.

EXAMPLE 16

*11α-hydroxy-4,16-pregnadiene-3,20-dione*

In a manner as given in Example 7, 11α-butyroxy-4,16-pregnadiene-3,20-dione is hydrolyzed with potassium hydroxide in aqueous dioxane to give 11α-hydroxy-4,16-pregnadiene-3,20-dione.

EXAMPLE 17

*11α-hydroxy-4,16-pregnadiene-3,20-dione*

In a manner as given in Example 7, 11α-benzoyloxy-4,16-pregnadiene-3,20-dione is hydrolyzed with potassium hydroxide in aqueous dioxane to give 11α-hydroxy-4,16-pregnadiene-3,20-dione.

In the same manner as in Examples 6, 9, 11, 13 and 15, selected 11α-acyloxy-17α-halo-4-pregnene-3,20-diones are heated with pyridine, collidine, lutidine, picoline, or other bases to produce the corresponding 11α-acyloxy-4,16-pregnadiene-3,20-diones such as: 11α-valeroxy-4,16-pregnadiene-3,20-dione, 11α-isovaleroxy-4,16-pregnadiene-3,20-dione, 11α-hexanoyloxy-4,16-pregnadiene-3,20-dione, 11α-heptanoyloxy-4,16-pregnadiene-3,20-dione, 11α-octanoyloxy-4,16-pregnadiene-3,20-dione, 11α-phenylacetoxy-4,16-pregnadiene-3,20-dione, 11α-toluyloxy-4,16-pregnadiene-3,20-dione, 11α-trimethylacetoxy-4,16-pregnadiene-3,20-dione, 11α-mono-, di-, and trichloroacetoxy-4,16-pregnadiene-3,20-dione, 11α-bromoacetoxy-4,16-pregnadiene-3,20-dione, 11α-anisyloxy-4,16-pregnadiene-3,20-dione, 11α-gallyloxy-4,16-pregnadiene-3,20-dione, 11α-mandelyloxy-4,16-pregnadiene-3,20-dione, 11α-thioglycolyloxy-4,16-pregnadiene-3,20-dione, 11α-toluenesulfonyloxy-4,16-pregnadiene-3,20-dione, 11α-benzenesulfonyloxy-4,16-pregnadiene-3,20-dione, 11α-chlorobenzenesulfonyloxy-4,16-pregnadiene-3,20-dione, 11α-(α-naphthylsulfonyloxy)-4,16-pregnadiene-3,20-dione, 11α-benzenephosphonyloxy-4,16-pregnadiene-3,20-dione, and the like.

In the same manner as in Examples 7, 10, 12, 14, 16 and 17, a thus-obtained 11α-acyloxy-4,16-pregnadiene-3,20-dione upon heating with sodium or potassium hydroxide in aqueous dioxane, methanol, ethanol, or tertiary butyl alcohol yields 11α-hydroxy-4,16-pregnadiene-3,20-dione.

It is to be understood that the invention is not to be limited to the exact details or exact compounds shown and described, as obvious modifications and equivalents will be apparent to one skilled in the art, and the invention is therefore to be limited only by the scope of the appended claims.

We claim:
1. An 11α-oxygenated-4,16-pregnadiene-3,20-dione of the formula:

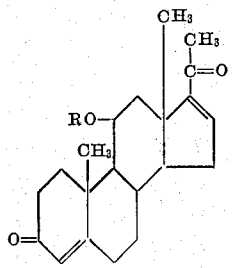

wherein R is selected from the group consisting of hydrogen and the acyl radical of a hydrocarbon carboxylic acid containing up to and including eight carbon atoms.

2. 11α-hydroxy-4,16-pregnadiene-3,20-dione.
3. An 11α-acyloxy-4,16-pregnadiene-3,20-dione wherein acyl is the acyl radical of a hydrocarbon carboxylic acid containing up to and including eight carbon atoms.
4. 11α-acetoxy-4,16-pregnadiene-3,20-dione.
5. 11α-propionoxy-4,16-pregnadiene-3,20-dione.
6. 11α-(β-cyclopentyl)-propionoxy-4,16-pregnadiene-3,20-dione.
7. 11α-benzoyloxy-4,16-pregnadiene-3,20-dione.

8. A process for the production of a compound selected from the group consisting of 11α-hydroxy-4,16-pregnadiene-3,20-dione and esters thereof which comprise: forming a 3-hydrazone of 11α-acyloxy-17α-halo-4-pregnene-3,20-dione by reacting a 4,17α-dihalo-11α-acyloxypregnane-3,20-dione, wherein the acyloxy group contains from one to eight carbon atoms, inclusive, with an organic hydrazine, hydrolyzing the thus-produced 3-hydrazone by an exchange reaction with a ketaldone to yield the corresponding 11α-acyloxy-17α-halo-4-pregnene-3,20-dione, and dehydrohalogenating the thus-obtained 11α-acyloxy-17α-halo-4-pregnene-3,20-dione to obtain the corresponding 11α-acyloxy-4,16-pregnadiene-3,20-dione.

9. A process for the production of a compound selected from the group consisting of 11α-hydroxy-4,16-pregnadiene-3,20-dione and esters thereof which comprise: forming a 3-hydrazone of 11α-acyloxy-17α-halo-4-pregnene-3,20-dione by reacting a 4,17α-dihalo-11α-acyloxypregnane-3,20-dione, wherein the acyloxy group contains from one to eight carbon atoms, inclusive, with an organic hydrazine, hydrolyzing the thus-produced 3-hydrazone by an exchange reaction with a ketaldone selected from the group of pyruvic acid, pyruvic aldehyde, and benzaldehydes to yield the corresponding 11α-acyloxy-17α-halo-4-pregnene-3,20-dione, and dehydrohalogenating the thus-obtained 11α-acyloxy-17α-halo-4-pregnene-3,20-dione to obtain the corresponding 11α-acyloxy-4,16-pregnadiene-3,20-dione.

10. A process for the production of 11α-acyloxy-4,16-pregnadiene-3,20-dione which comprise: forming the 3-hydrazone of 11α-acyloxy-17α-chloro-4-pregnene-3,20-dione by reacting a 4,17α-dichloro-11α-acyloxypregnane-3,20-dione, wherein the acyloxy group contains from one to eight carbon atoms, inclusive, with an organic hydrazine, hydrolyzing the thus-produced 3-hydrazone by an exchange reaction with a ketaldone selected from the group of pyruvic acid, pyruvic aldehyde, and benzaldehydes, to yield the corresponding 11α-acyloxy-17α-chloro-4-pregnene-3,20-dione, and heating the thus obtained 11α-acyloxy-17α-chloro-4-pregnene-3,20-dione with an amine to obtain the corresponding 11α-acyloxy-4,16-pregnadiene-3,20-dione.

11. A process for the production of 11α-acyloxy-4,16-pregnadiene-3,20-dione which comprise: forming the 3-hydrazone of 11α-acyloxy-17α-chloro-4-pregnene-3,20-dione by reacting a 4,17α-dichloro-11α-acyloxypregnane-3,20-dione, wherein the acyloxy group contains from one to eight carbon atoms, inclusive, with an organic hydrazine, hydrolyzing the thus-produced 3-hydrazone by an exchange reaction with a ketaldone to yield the corresponding 11α-acyloxy-17α-chloro-4-pregnene-3,20-dione, and heating the thus obtained 11α-acyloxy-17α-chloro-4-pregnene-3,20-dione with an amine selected from the group consisting of pyridine, collidine, picoline, lutidine and aniline to obtain the corresponding 11α-acyloxy-4,16-pregnadiene-3,20-dione.

12. A process for the production of 11α-acyloxy-4,16-pregnadiene-3,20-dione which comprise: reacting a 4,17α-dichloro-11α-acyloxypregnane-3,20-dione, wherein the acyloxy group contains from one to eight carbon atoms, inclusive, with semicarbazide, treating the thus obtained 3-semicarbazone of 11α-acyloxy-17α-chloro-4-pregnene-3,20-dione with pyruvic acid to obtain the corresponding 11α-acyloxy-17α-chloro-4-pregnene-3,20-dione, and heating the thus obtained 11α-acyloxy-17α-chloro-4-pregnene-3,20-dione with pyridine to obtain the corresponding 11α-acyloxy-4,16-pregnadiene-3,20-dione.

13. In a process for the production of 11α-hydroxy-4,16-pregnadiene-3,20-dione, the steps which comprise: forming the 3-hydrazone of 11α-acyloxy-17α-halo-4-pregnene-3,20-dione by reacting a 4,17α-dihalo-11α-acyloxypregnene-3,20-dione, wherein the acyloxy group contains from one to eight carbon atoms, inclusive, with an organic hydrazine, hydrolyzing the thus-produced 3-hydrazone by an exchange reaction with a ketaldone selected from the group of pyruvic acid, pyruvic aldehyde, and benzaldehydes to yield the corresponding 11α-acyloxy-17α-halo-4-pregnene-3,20-dione, heating the thus obtained 11α-acyloxy-17α-halo-4-pregnene-3,20-dione with an amine to obtain the corresponding 11α-acyloxy-4,16-pregnadiene-3,20-dione, and hydrolyzing the thus-obtained 11α-ester to 11α-hydroxy-4,16-pregnadiene-3,20-dione.

14. A process for the production of 11α-acyloxy-4,16-pregnadiene-3,20-dione which comprise: forming the 3-hydrazone of 11α-acyloxy-17α-bromo-4-pregnene-3,20-dione by reacting a 4,17α-dibromo-11α-acyloxypregnane-3,20-dione, wherein the acyloxy group contains from one to eight carbon atoms, inclusive, with an organic hydrazine, hydrolyzing the thus-produced 3-hydrazone by an exchange reaction with a ketaldone selected from the group of pyruvic acid, pyruvic aldehyde, and benzaldehydes, to yield the corresponding 11α-acyloxy-17α-bromo-4-pregnene-3,20-dione, and heating the thus-obtained 11α-acyloxy-17α-bromo-4-pregnene-3,20-dione with an amine to obtain the corresponding 11α-acyloxy-4,16-pregnadiene-3,20-dione.

15. A process for the production of 11α-acyloxy-4,16-pregnadiene-3,20-dione which comprise: forming the 3-hydrazone of 11α-acyloxy-17α-bromo-4-pregnene-3,20-dione by reacting a 4,17α-dibromo-11α-acyloxypregnane-3,20-dione, wherein the acyloxy group contains from one to eight carbon atoms, inclusive, with an organic hydrazine, hydrolyzing the thus-produced 3-hydrazone by an exchange reaction with a ketaldone to yield the corresponding 11α-acyloxy-17α-bromo-4-pregnene-3,20-dione, and heating the thus obtained 11α-acyloxy-17α-bromo-4-pregnene-3,20-dione with an amine selected from the group consisting of pyridine, collidine, picoline, lutidine and aniline to obtain the corresponding 11α-acyloxy-4,16-pregnadiene-3,20-dione.

16. A process for the production of 11α-acyloxy-4,16-pregnadiene-3,20-dione which comprise: reacting a 4,17α-dibromo-11α-acyloxy-pregnane-3,20-dione, wherein the acyloxy group contains from one to eight carbon atoms, inclusive, with semicarbazide, treating the thus obtained 3-semicarbazone of 11α-acyloxy-17α-bromo-4-pregnene-3,20-dione with pyruvic acid to obtain the corresponding 11α-acyloxy-17α-bromo-4-pregnene-3,20-dione, and heating the thus obtained 11α-acyloxy-17α-bromo-4-pregnene-3,20-dione with pyridine to obtain the corresponding 11α-acyloxy-4,16-pregnadiene-3,20-dione.

No references cited.